United States Patent [19]
Dais et al.

[11] Patent Number: 5,187,249
[45] Date of Patent: Feb. 16, 1993

[54] DEGRADABLE B-ALKOXY VINYL KETONE RESIN COMPOSITION

[75] Inventors: Virginia A. Dais; Duane B. Priddy, both of Midland, Mich.

[73] Assignee: The Dow Chemical Company, Midland, Mich.

[21] Appl. No.: 604,518

[22] Filed: Oct. 29, 1990

[51] Int. Cl.$^5$ .................. C08F 16/36; C08F 16/12
[52] U.S. Cl. ..................... 526/316; 260/DIG. 43; 526/318.4; 526/318.6; 526/329.6; 526/332; 526/334; 526/342; 526/345; 526/347

[58] Field of Search ............... 260/DIG. 43; 526/316, 526/329.6, 332, 334

[56] References Cited

U.S. PATENT DOCUMENTS 4,025,580  5/1977  Taylor ............... 260/DIG. 43
4,056,665  11/1977  Taylor ............... 260/DIG. 43

Primary Examiner—Joseph L. Schofer
Assistant Examiner—Fred Zitomer

[57] ABSTRACT

Photodegradable polymers comprising B-alkoxy substituted vinyl ketone functionality and thermoplastic articles formed therefrom.

5 Claims, No Drawings

DEGRADABLE B-ALKOXY VINYL KETONE RESIN COMPOSITION

BACKGROUND OF THE INVENTION

This invention relates to novel plastic compositions having enhanced environmental degradability. More particularly the present invention relates to thermoplastic resins having enhanced rates of photodegradation.

The advent of thermoplastics has given rise to improved articles and packaging. For example, molded, foamed, and thermoformed articles, such as solid objects, films, bottles, bags, cartons, and other containers have the advantages of being chemically resistant, relatively unbreakable, and light in weight. However, the increasing use of thermoplastics in packaging and other applications has created a serious waste disposal problem. Many plastic objects litter the countryside after being discarded by careless users.

One approach to the alleviation of the problem of plastic waste and litter is the development of novel polymeric compositions which undergo accelerated degradation under environmental conditions. This general approach has been described in the prior art.

Photosensitizing ketone groups have been introduced into the structure of polymer molecules by the copolymerization of ethylenically unsaturated monomers with vinyl ketones. For example, reference is made to U.S. Pat. Nos. 3,753,952, 3,860,538 and 4,176,145 which describe the preparation of photodegradable polymeric materials by the copolymerization of vinyl- or isopropenyl ketones with copolymerizable comonomers.

Polymers having ketone groups at positions adjacent to the chain, such as those derived from vinyl ketone comonomers, undergo photochemical degradation by direct photolytic chain scission. This mechanism leads to a rapid decrease in molecular weight upon exposure to ultraviolet radiation. As a result, articles formed from the polymer become friable and soon are crushed to small particulates which are incorporated with the soil.

However, often the rate of degradation by exposing such polymers to light is not sufficiently high to result in appreciable destruction of objects made from such polymers. It would be desirable to provide polymers having increased susceptibility to photodegradation.

It would be desirable to provide a thermoplastic resin suitable for use in the manufacture of containers, packaging, films and foams that is highly susceptible to ultraviolet light degradation. Such a polymer would allow greater efficiency in use. That is, polymers containing reduced amounts of the applicable degradation inducing component could be prepared. In addition blends utilizing reduced amounts of such polymer could also be prepared.

According to the present invention there are provided polymeric compositions comprising repeating units corresponding to the formulas:

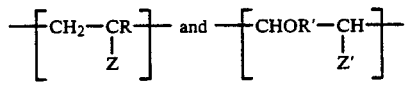

wherein R is hydrogen or R'; R' is $C_{1-6}$ alkyl; Z is phenyl, halo, nitrile or C(O)OR; and Z' is a $C_{2-10}$ ketone containing aliphatic or aromatic moiety derived from a vinyl ketone or substituted derivative thereof. The present polymers possess enhanced photodegradability due to the presence of alkoxy functionality in the B-chain position from the pendant ketone functionality.

The polymers are suitably prepared by copolymerizing 1) one or more vinyl monomers selected from the group consisting of styrene, vinyl chloride, acrylonitrile, acrylic acid, methacrylic acid and $C_{1-6}$ alkyl esters of acrylic acid or methacrylic acid, with 2) one or more $C_{5-16}$ vinyl ketone monomers containing $C_{1-6}$ alkoxy functionality in the B-position of the vinyl group.

The vinyl ketone monomers more particularly correspond to the formula:

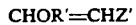

wherein R' and Z' are as previously defined. Especially suitable are monomers wherein Z' is —C(O)R'' wherein R'' is methyl, ethyl, propyl, butyl, phenyl or benzyl. A most preferred ketone functional monomer is 4-methoxy-3-butene-2-one. A preferred vinyl monomer is styrene.

The polymers may be prepared by polymerization of the respective monomers under free radical, solution or bulk polymerization conditions. Preferably the respective monomers are combined in the presence of a free radical initiator at temperatures from 25° to 200° C., more preferably 50° to 150° C. Suitable free radical initiators include peroxide or azo containing compounds. A solvent such as toluene, tetrahydrofuran, or similar non-reactive liquid may also be present.

Preferably the quantity of monomers is adjusted so as to provide from 0.1 to 10.0 mole percent, more preferably 0.2 to 5.0 mole percent, most preferably from 0.5 to 1.0 mole percent of the ketone functional monomer component in the polymer.

The polymers preferably have an initial molecular weight (Mw) from 50,000 to 2,000,000, more preferably from 100,000 to 1,000,000. Molecular weights are determined according to gel permeation chromatography using a polystyrene standard.

The polymers are readily thermoformed, molded or extruded into films according to known fabrication techniques. Secondary operations such as foaming, orientation, printing, etc. are also easily performed utilizing previously known techniques. Advantageously the polymers according to the present invention readily decompose into particulates upon exposure to ultraviolet radiation.

Having described the invention the following examples are provided as further illustrative and are not to be construed as limiting.

EXAMPLES 1-2

Sealed, glass ampoules containing styrene and 10 (Example 1) or 40 (Example 2) weight percent 4-methoxy-3-butene-2-one (MBO) were heated in a 150° C. oil bath for several hours. The resulting polymers were precipitated three times from a toluene/methanol mixture. Analysis by $^{13}C$ NMR indicated that the carbonyl content (vinyl ketone monomer content) of the polymer prepared in Example 2 was 1.4 mole percent. Films were cast from solution and exposed to ultraviolet light in an artificial weathering chamber. Molecular weight before and after exposures of 8 and 24 hours were determined by gel permeation chromatography based on a polystyrene standard. Decrease in molecular weight was taken as an indicator of effective chain scission by light. Results are contained in Table I.

TABLE I

| Sample | Initial Molecular weight (Mw × 10³) | after 8 hour exposure (Mw × 10³) | after 24 hour Exposure (Mw × 10³) |
|---|---|---|---|
| Example 1 | 238 | | 205 |
| Example 2 | 153 | 12 | 12 |
| Comparative* | 267 | — | 266 |

*polystyrene standard

What is claimed is:

1. Thermoplastic polymers comprising repeat units corresponding to the formulas:

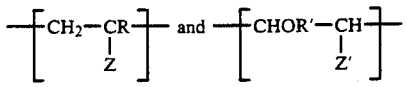

wherein R is hydrogen or R'; R' is $C_{1-6}$ alkyl; Z is phenyl, halo, or C(O)OR; and Z' is a $C_{2-10}$ ketone containing aliphatic or aromatic moiety derived from a vinyl ketone or substituted derivative thereof.

2. A thermoplastic polymer according to claim 1 wherein Z is phenyl.

3. A thermoplastic polymer according to claim 1 wherein Z' is methylcarbonyl.

4. A thermoplastic polymer according to claim 1 comprising from 0.1 to 10.0 mole percent vinyl ketone monomer.

5. A thermoplastic article having enhanced photodegradation properties comprising a polymer according to claim 1.

* * * * *